United States Patent
Natesh

(10) Patent No.: US 10,411,239 B2
(45) Date of Patent: Sep. 10, 2019

(54) BATTERY SEPARATOR WITH RIBS AND A METHOD OF CASTING THE RIBS ON THE SEPARATOR

(71) Applicant: H&V Advanced Materials (India) Private Limited, Mysuru (IN)

(72) Inventor: Gubbi Krishnappa Natesh, Vijayanagara (IN)

(73) Assignee: H&V Advanced Materials (India) Private Limited, Bangalore (IN)

( * ) Notice: Subject to any disclaimer, the term of this patent is extended or adjusted under 35 U.S.C. 154(b) by 0 days.

(21) Appl. No.: 15/510,339

(22) PCT Filed: Sep. 11, 2014

(86) PCT No.: PCT/IB2014/064420
§ 371 (c)(1),
(2) Date: Mar. 10, 2017

(87) PCT Pub. No.: WO2016/038424
PCT Pub. Date: Mar. 17, 2016

(65) Prior Publication Data
US 2017/0294639 A1    Oct. 12, 2017

(51) Int. Cl.
*H01M 2/14* (2006.01)
*H01M 2/16* (2006.01)
(Continued)

(52) U.S. Cl.
CPC .............. *H01M 2/18* (2013.01); *B29C 39/025* (2013.01); *B29C 39/10* (2013.01); *B29C 39/18* (2013.01); *B29C 39/24* (2013.01); *H01M 2/145* (2013.01); *H01M 2/1653* (2013.01); *B29K 2709/08* (2013.01); *B29K 2713/00* (2013.01);
(Continued)

(58) Field of Classification Search
CPC .......... H01M 2/18; H01M 2/14; H01M 2/145; H01M 2/16; H01M 2/1653
See application file for complete search history.

(56) References Cited

U.S. PATENT DOCUMENTS

| 4,490,447 A | 12/1984 | Battersby |
| 5,154,988 A | 10/1992 | Choi et al. |

(Continued)

FOREIGN PATENT DOCUMENTS

| EP | 1 617 495 A1 | 1/2006 |
| JP | 2003-109571 A | 4/2003 |
| WO | WO 2012/040395 A2 | 3/2012 |

OTHER PUBLICATIONS

International Search Report and Written Opinion for PCT/IB2014/064420 dated Apr. 1, 2015.
(Continued)

*Primary Examiner* — Karie O'Neill Apicella
(74) *Attorney, Agent, or Firm* — Wolf, Greenfield & Sacks, P.C.

(57) ABSTRACT

The present disclosure provides a method of casting ribs on substrate, said method comprising acts of, mounting applicator comprising plurality of nozzles and polymer filled into the applicator, placing the substrate below the nozzles of the applicator, applying pressure onto the melt polymer to cast plurality of polymer ribs of predetermined shape on the substrate, and cooling the substrate casted with ribs.

19 Claims, 2 Drawing Sheets

(51) Int. Cl.
  *H01M 2/18* (2006.01)
  *B29C 39/18* (2006.01)
  *B29C 39/24* (2006.01)
  *B29C 39/02* (2006.01)
  *B29C 39/10* (2006.01)
  *H01M 10/06* (2006.01)
  *B29L 31/34* (2006.01)
  *B29K 709/08* (2006.01)

(52) U.S. Cl.
  CPC ...... *B29L 2031/3468* (2013.01); *H01M 10/06* (2013.01); *H01M 2220/20* (2013.01); *Y02E 60/126* (2013.01)

(56) References Cited

U.S. PATENT DOCUMENTS

| | | | |
|---|---|---|---|
| 5,558,952 A * | 9/1996 | Knauer | H01M 2/18 429/139 |
| 8,404,378 B2 | 3/2013 | Whear et al. | |
| 9,293,748 B1 | 3/2016 | Ashirgade et al. | |
| 9,577,236 B2 | 2/2017 | Ashirgade et al. | |
| 9,627,668 B1 | 4/2017 | Ashirgade et al. | |
| 9,728,756 B2 | 8/2017 | Ashirgade et al. | |
| 9,786,885 B2 | 10/2017 | Jiang | |
| 9,935,302 B2 * | 4/2018 | Miller | H01M 2/162 |
| 10,014,501 B2 | 7/2018 | Natesh et al. | |
| 2002/0165291 A1 * | 11/2002 | Choi | B32B 27/32 522/114 |
| 2003/0129486 A1 * | 7/2003 | Bohnstedt | H01M 2/18 429/143 |
| 2008/0299462 A1 | 12/2008 | Whear et al. | |
| 2011/0091761 A1 | 4/2011 | Miller et al. | |
| 2012/0070713 A1 | 3/2012 | Whear et al. | |
| 2012/0070727 A1 | 3/2012 | Wertz et al. | |
| 2012/0070728 A1 | 3/2012 | Wertz et al. | |
| 2012/0070729 A1 | 3/2012 | Wertz et al. | |
| 2012/0070747 A1 | 3/2012 | Whear et al. | |
| 2013/0071723 A1 | 3/2013 | Wertz et al. | |
| 2013/0071734 A1 | 3/2013 | Wertz et al. | |
| 2013/0071735 A1 | 3/2013 | Wertz et al. | |
| 2014/0227585 A1 | 8/2014 | Wertz et al. | |
| 2014/0272535 A1 | 9/2014 | Clement et al. | |
| 2016/0079581 A1 | 3/2016 | Ashirgade et al. | |
| 2016/0149183 A1 | 5/2016 | Keisler et al. | |
| 2016/0164058 A1 | 6/2016 | Ashirgade et al. | |
| 2016/0301053 A1 | 10/2016 | Jiang | |
| 2017/0092917 A1 | 3/2017 | Ashirgade et al. | |
| 2017/0170442 A1 | 6/2017 | Ashirgade et al. | |
| 2017/0179454 A1 | 6/2017 | Natesh et al. | |
| 2017/0373293 A1 | 12/2017 | Jiang | |
| 2018/0026247 A1 | 1/2018 | Ashirgade et al. | |
| 2018/0047964 A1 | 2/2018 | Natesh et al. | |
| 2018/0145298 A1 | 5/2018 | Vulfson et al. | |
| 2018/0175392 A1 | 6/2018 | Wertz et al. | |

OTHER PUBLICATIONS

Turbak, Nonwovens: Theory, Process, Performance, and Testing. Tappi Press 1993. Excerpt pp. 144-147.

Zguris et al., Nonwovens Battery Separators to improve performance in lead acid battery systems. Mabat Conference. Warsaw, Poland. Jul. 24, 1991. 17 pages.

* cited by examiner

BATTERY SEPARATOR WITH RIBS AND A METHOD OF CASTING THE RIBS ON THE SEPARATOR

RELATED APPLICATIONS

This application is a U.S. National Stage patent application based on International Application PCT/IB2014/064420, filed Sep. 11, 2014, which is incorporated herein by reference in its entirety.

TECHNICAL FIELD

This present disclosure relates to a battery separator, more particularly relates to battery separator comprising ribs and method of laying the ribs on the battery separator.

BACKGROUND OF THE DISCLOSURE

All batteries require a battery separator which is used to separate positive and negative electrode at the same time allowing ionic conduction. The separator base web or back web thickness and overall thickness which is thickness of the separator with rib or glass mat or both, depends on type of separator, type of application and life of the battery expected.

Most polyethylene separators are produced with a variety of rib designs, which are provided on either one or both sides of the back web. The thickness, width and angle of rib vary from application to application and from brand to brand. Most automotive separators carry a rib of 0.7 mm and they are placed generally 1 cm apart and they are present all along the length of the separator. These ribs help creating extra space between the electrodes to provide additional volume of electrolyte which is required for the performance of the battery. In applications such as stationary and traction applications, the rib thickness can be as high as 1.2 mm and in number of designs they are present on both sides of the back web. This is done considering the life expectancy of the battery, requirement of higher amount of electrolyte between the electrodes.

Typically the ribs are provided on polyethylene separators by an on line process wherein the extruded polyethylene separator web is passed between a pair of calendared rolls carrying grooves which produce ribs on the polyethylene when it passes through the calendar. For every change in design and dimension of the rib, a new set of specially designed pair of calendared rolls have to be used.

Similarly, the PVC separators are provided with ribs on either one or both sides depending on end use of the battery. Typical thickness of such ribs is around 1.0 mm and in some applications the final thickness of the separator can be as high as 4 mm. In sintered PVC separators, the ribs are provided by doctoring the sintered resin through a grooved roll. The grooves actually create a continuous rib on the separator. In case of extruded or calendared PVC separators, the process of forming rib is similar to polyethylene where the pair of calendar rolls carries the impression of the desired rib design. There are also separators which are rib less but use corrugation as a process to increase the overall thickness of the separator. In such cases also, the total weight of separator increases due to increase area of separator consumed in the process of corrugation.

Hence, the weight of rib in separators is considerable. Cost of making a new rib is also expensive as it demands change of new calendar rolls and the electrolyte displaced due to the additional volumes of these rib materials is also higher. It is well known in battery design that the separators should have lowest acid displacement. Higher the acid displaced, lower is the battery performance.

Most type of separators made by wet laid technology such as SPG separators resin impregnated cellulose and other composite separators heavily rely on use of glass mat, very thick back web, rarely on extruded rib or combination of these. Most of these separators require a glass mat or a rib or both depending on end application and also due to the limitation of the composition such as degradation of oxidation, higher pore size etc.

Most wet laid separators vary their thickness by making changes to the thickness of the back web and thickness of the glass mat. As the thickness of the back web or glass mat increases, the cost of the separator increases substantially. And in applications where both back web, glass mat thickness and glass mat and rib is all used in combination, the cost of the separator increases substantially. The thickness increase achieved by these techniques not only increase the cost but also reduce the performance of the battery as the acid displaced is high and more mass of material in between electrodes means higher electrical resistance of the separator which in turn effects the performance of the battery.

It was observed from the prior art search that there are no separators or separator making technologies other than use of a rib or glass mat to increase the overall thickness of the separator. It is possible that all existing techniques of separator production are limited either to use a continuous rib or a glass mat or both to increase the overall thickness of the separator. The purpose of a glass mat or rib is only to make provision for additional electrolyte but at a considerable cost addition. Any attempt to reduce length of a rib is limited by the hitherto known production techniques or alternative methods not thought off.

STATEMENT OF THE DISCLOSURE

Accordingly the present disclosure provides a method of casting ribs on substrate, said method comprising acts of mounting applicator comprising plurality of nozzles and melt polymer filled into the applicator, placing the substrate below the nozzles of the applicator, applying pressure onto the melt polymer to cast plurality of polymer ribs of predetermined shape on the substrate, and cooling the substrate casted with ribs and also provides a substrate of predetermined shape comprising plurality of ribs of predetermined shape in predetermined manner.

BRIEF DESCRIPTION OF THE ACCOMPANYING FIGURES

Figure 1:
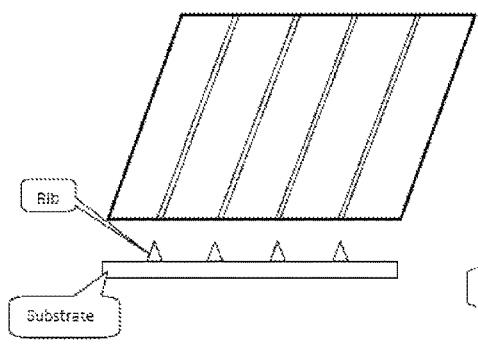
FIG. 1 illustrates separator with straight triangular ribs.
Figure 2:
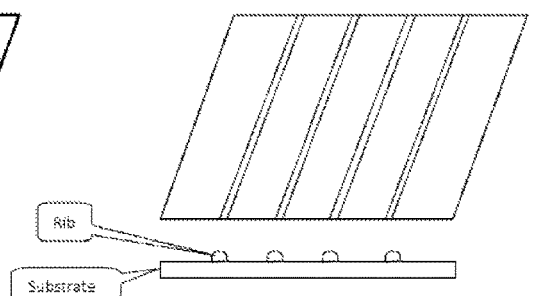
FIG. 2 illustrates separator with straight curved ribs.
Figure 3:
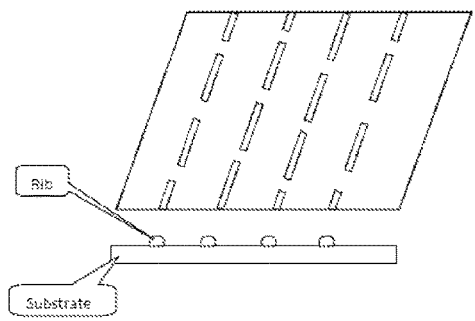
FIG. 3 illustrates separator with vertical intermittent ribs.
Figure 4:
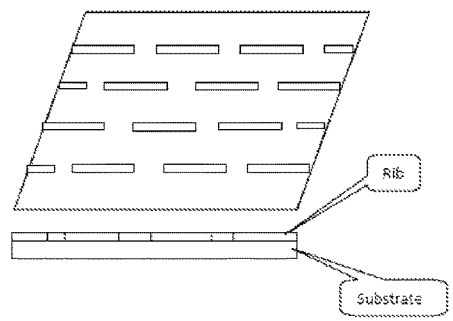
FIG. 4 illustrates separator with horizontal intermittent ribs.
Figure 5:
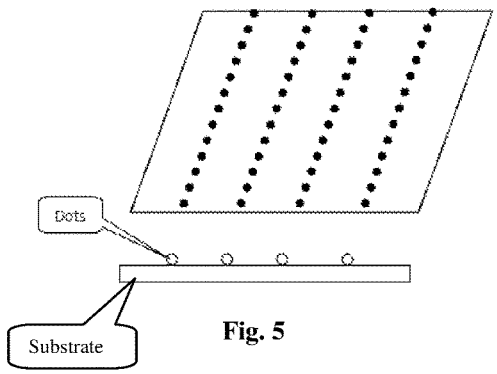
FIG. 5 illustrates separator with dots.
Figure 6:
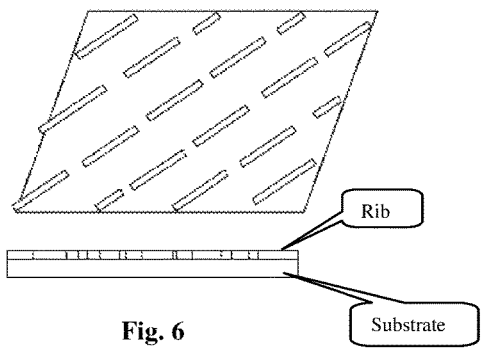
FIG. 6 illustrates separator with diagonal intermittent ribs.
Figure 7:
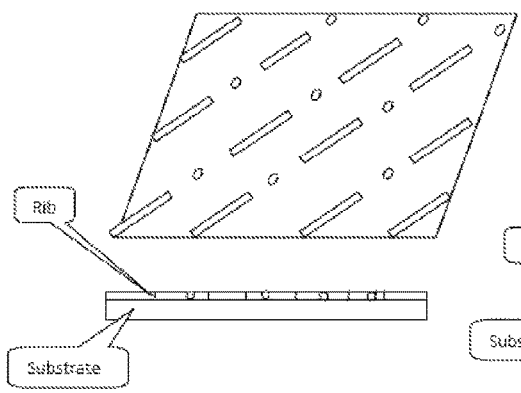
FIG. 7 illustrates separator with cross intermittent and dots.
Figure 8:
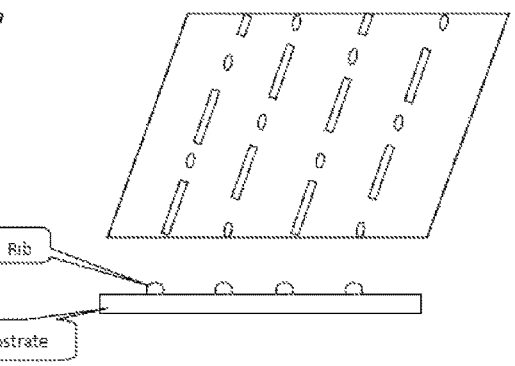
FIG. 8 illustrates separator with straight dash ribs and dots.
Figure 9:
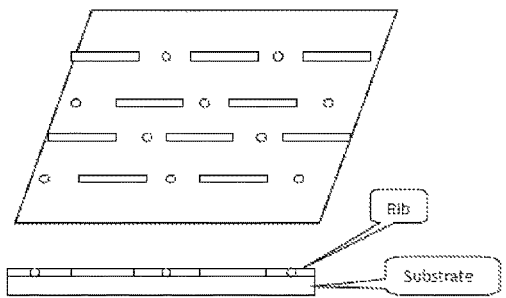
FIG. 9 illustrates separator with horizontal dash and dots.
Figure 10:
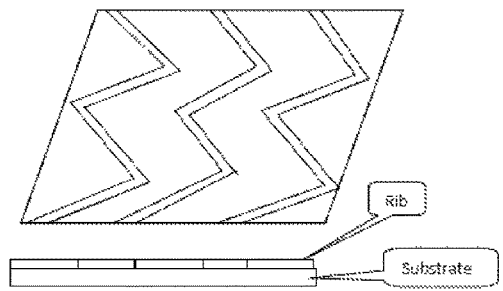
FIG. 10 illustrates separator with zig zag ribs.
Figure 11:
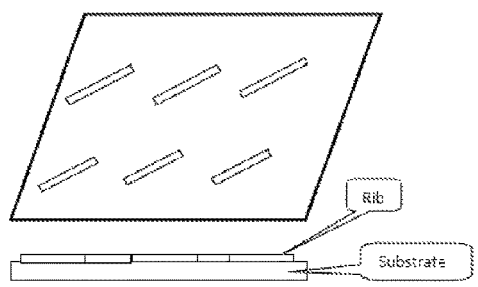
FIG. 11 illustrates separator with intermittent zig zag ribs.
Figure 12:
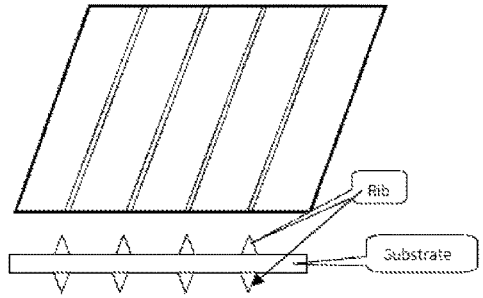
FIG. 12 illustrates separator with double side triangular ribs.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

This disclosure is drawn, inter-alia, to a battery separator. More particularly disclosure, relates to battery separator comprising ribs and method of laying the ribs on the battery separator.

The principal embodiment of the present disclosure provides a method of casting ribs on substrate, said method comprising acts of, mounting applicator comprising plurality of nozzles and melt polymer filled into the applicator, placing the substrate below the nozzles of the applicator, applying pressure onto the melt polymer to cast plurality of polymer ribs of predetermined shape on the substrate, and cooling the substrate casted with ribs.

In one embodiment of the present disclosure, the substrate is in the form of rolls or sheets before casting of ribs on its surface and wherein the casted ribbed substrate is cut to a desired size to form a battery separator.

In one embodiment of the present disclosure, size of the ribs is varied by regulating the applied pressure, viscosity of the polymer, size of the nozzle opening and feed of the substrate.

In one embodiment of the present disclosure, said ribs are applied in configurations of continuous longitudinal ribs, discontinuous longitudinal ribs, continuous diagonal ribs, discontinuous diagonal ribs, dispersed dots, and dispersed beads with varying densities.

In one embodiment of the present disclosure, the applicators are hot melt glue applicators.

In one embodiment of the present disclosure, the polymer for casting ribs is melted in the applicator and said polymer is selected from a group comprising polyester, polyethylene, polypropylene, and ethylene vinyl acetate.

In one embodiment of the present disclosure, the separator is additionally attached with glass mat by pressing.

The present disclosure is also in relation to a substrate of predetermined shape comprising plurality of ribs of predetermined shape in predetermined manner.

In one embodiment of the present disclosure, said substrate is in the form of rolls or sheets before casting ribs on its surface and is cut to a desired size to form a battery separator.

In one embodiment of the present disclosure, said ribs are in configurations of continuous longitudinal ribs, discontinuous longitudinal ribs, continuous diagonal ribs, discontinuous diagonal ribs, dispersed dots, and dispersed beads with varying densities.

In one embodiment of the present disclosure, the process of casting the ribs on separator back web is done by applying polymer dots or beads by a polymer applicator which injects the polymer melt at high pressure and the size of the polymer dot or bead is controlled by varying the pressure, viscosity and size of the nozzle and also the speed of the back web.

In one embodiment of the present disclosure, the most suitable polymer applicators are hot melt glue applicators which have a polymer melt tank, a polymer melt pump and a set of nozzles to dispense the polymer melt along with required polymer transport hose and process control.

In one embodiment of the present disclosure, the polymer used for the dots or beads in the application has the properties such as resistant to electrolyte, does not melt in operating temperature of the battery and also resists the electrochemical oxidation inside the battery cell. The said polymer is selected from the group comprising polyester, polyethylene, polypropylene, ethylene vinyl acetate and the polymer used is either designed or modified to flow in the applicator with required adhesion levels to the separator back web.

In one embodiment of the present disclosure, the separator applied or dotted by above process optionally attached with a glass mat by passing a continuous layer of glass mat and just pressing it adequately to stick but not allowing the dot or bead to spread or smudge. By this process, the glass mat sticks to separator back web without the need for additional adhesive layer.

In one embodiment of the present disclosure, the orientation of the dot or beads can be changed by incorporating an oscillation mechanism to the polymer dispensers. As the dispenser moves on horizontal axis, the beads form in an angle diagonal to the length of the separator. The angle is controlled by changing the rate at which the polymer dispenser oscillates.

The above process can be adopted in any of the known separator making process technologies there by extending the benefits of new separator design.

By using multiple polymer dispensers, the beads or dots can be laid on either or both sides of the separator simultaneously or alternatively.

In one embodiment of the present invention, the size of the polymer dot or bead can be easily adjusted by flow rate of polymer, open and close time of valve in the dispenser of the nozzle.

By changing the frequency of valve opening time, the length of the bead can be varied from a very small dot of around 1 mm to a continuous line. The distance between dots or beads can be easily adjusted by changing the gap between the nozzles or by turning off the alternative nozzles.

The battery separator and the method of casting the ribs on the battery separator are explained using following steps firstly, the polymer applicator is mounted just after where the separator back web is formed. For example in wet laid separator technology, it is just before the separator is wound on pope reel and in Polyethylene separator, it is just after the oil is extracted but before the separator is wound on reels. Then, the separator back web in roll or sheet form without ribs is passed below the polymer applicator with nozzles placed for achieving gap between dots as desired. For example 25 mm. The polymer used in the applicator is the one suitable for the particular battery chemistry for example polyester based hot melt for lead acid batteries and polyamide based or attactic polypropylene based for alkaline battery chemistry. The dot or bead size is adjusted by changing the valve open and close timer. The nozzle is oscillated for changing the angle of the dot or bead. The dot or bead is cooled by air till it becomes hard. Optionally, a glass mat web is gently pressed just before polymer cools to attach the glass mat. The separator is then cut to size.

Example 1

This example shows settings to make a ribbed separator wherein the ribs are in the form of discrete dot. The dotted design offers lowest cost per sq.m with lowest resistance for the flow of ions inside the cell in the battery thereby reducing total internal resistance of the battery. The table below shows experiments conducted under four settings from setting 'A" to "D" Adhesive used: Advantra PHP 9250 made by H B Fullers.

TABLE 1

| Machine Parameter | Unit | Experiment number A | B | C | D |
|---|---|---|---|---|---|
| Tank Temperature | Deg. C. | 140 | 140 | 140 | 140 |
| Tank Pressure | kg/cm2 | 3.5 | 3.5 | 3.5 | 3.5 |
| Conveyor Speed | MPM | 25 | 25 | 25 | 25 |
| Angle between web and gun | deg | 90 | 90 | 90 | 90 |
| Distance between web and gun | mm | 15 | 15 | 15 | 15 |
| Nozzle Opening | tow | 8 | 8 | 8 | 8 |
| On Time | milli Seconds | 30 | 25 | 20 | 15 |
| Off time | milli Seconds | 250 | 250 | 250 | 250 |
| Overall thickness | mm | 2.00 | 1.91 | 1.77 | 1.77 |
| Base web thickness in mm | mm | 0.56 | 0.56 | 0.56 | 0.56 |
| Dot Thickness | mm | 1.44 | 1.35 | 1.21 | 1.21 |
| Overall GSM | g/m2 | 200 | 203 | 200 | 200 |
| Base web GSM | g/m2 | 177 | 176 | 177 | 177 |
| Dot GSM | g/m2 | 32 | 27 | 23 | 23 |
| GSM per mm Dot | g/m2/mm | 22 | 20 | 19 | 19 |

TABLE 1-continued

| Machine Parameter | Unit | Experiment number A | B | C | D |
|---|---|---|---|---|---|
| Dot Diameter in mm | mm | 4.5 | 4.16 | 3.91 | 3.5 |
| Distance b/w dots in mm | mm | 23 | 23 | 23 | 23 |
| Product Properties | | | | | |
| Volume porosity | % | 65 | 67 | 69 | 69 |
| Electrical resistance | Ω-cm2 | 0.0150 | 0.0130 | 0.0100 | 0.0100 |

The results from the above table shows that the as we decrease the "On" time, we are able to reduce to the thickness and weight of the dot.

Example 2

This experiment shows setting for casting a continuous rib and varying the thickness of the rib by varying the speed of the substrate.

A composite separator known by brand name Hi-Sep by the applicant company is used as a substrate in this example.

A separator back web of 0.5 mm thickness is cast with ribs of continuous length using Nordson applicator named Alta blue melting tank with "Sure bead" guns to cast ribs of 1.0-2.30 mm wide and height 0.48-1.94 mm and each rib one inch apart. The thickness of the rib is varied by varying the conveyor speed from 2 MPM to 11 MPM. As the speed of the conveyor is increased, the adhesive consumption per mm is reduced significantly. The result is tabulated below. The polymer used is hot melt made by H B Fullers in the brand name Advantra 9250.

TABLE 2

| | Unit | Experiment number E | F | H | I | J | K | L | M | N | O |
|---|---|---|---|---|---|---|---|---|---|---|---|
| Machine Parameter | | | | | | | | | | | |
| Tank Temperature | Deg. C. | 130 | 130 | 130 | 130 | 130 | 130 | 130 | 130 | 130 | 130 |
| Tank Pressure | Kg/cm2 | 2 | 2 | 2 | 2 | 2 | 2 | 2 | 2 | 2 | 2 |
| Conveyor Speed | MPM | 2 | 3 | 4 | 5 | 6 | 7 | 8 | 9 | 10 | 11 |
| Angle between web and gun | Deg | 45 | 45 | 45 | 45 | 45 | 45 | 45 | 45 | 45 | 45 |
| Distance between web and gun | mm | 10 | 10 | 10 | 10 | 10 | 10 | 10 | 10 | 10 | 10 |
| Nozzle opening | tow | 8 | 8 | 8 | 8 | 8 | 8 | 8 | 8 | 8 | 8 |
| Overall thickness | mm | 2.53 | 1.55 | 1.42 | 1.35 | 1.28 | 1.17 | 1.13 | 1.11 | 1.08 | 1.05 |
| Base web thickness in mm | mm | 0.59 | 0.58 | 0.56 | 0.58 | 0.58 | 0.55 | 0.56 | 0.56 | 0.56 | 0.57 |
| Rib Thickness | mm | 1.94 | 0.97 | 0.86 | 0.77 | 0.70 | 0.62 | 0.57 | 0.55 | 0.52 | 0.48 |
| Overall GSM | g/m2 | 292 | 250 | 232 | 216 | 212 | 207 | 203 | 202 | 202 | 201 |
| Base web GSM | g/m2 | 173 | 181 | 181 | 174 | 178 | 175 | 176 | 181 | 179 | 179 |
| Rib GSM | g/m2 | 119 | 69 | 51 | 42 | 34 | 32 | 27 | 21 | 23 | 22 |
| GSM per mm rib | g/m2/mm | 61.34 | 71.13 | 59.30 | 54.55 | 48.57 | 51.61 | 47.37 | 38.18 | 44.23 | 45.83 |
| Width of the rib | mm | 2.3 | 2.25 | 1.87 | 1.71 | 1.48 | 1.26 | 1.21 | 1.15 | 1.11 | 1.08 |
| Product Properties | | | | | | | | | | | |
| Volume porosity | % | 53 | 61 | 63 | 65 | 67 | 66 | 68 | 69 | 67 | 70 |
| Electrical resistance | Ohms-cm2 | 0.116 | 0.095 | 0.081 | 0.085 | 0.077 | 0.075 | 0.079 | 0.077 | 0.081 | 0.073 |

Example 3

This example shows use of a specially compounded hot melt to achieve higher melting point for tropical climate:

High temperature grade hot melt is prepared by using following formulation using a premelt mixing tank:

TABLE 3

| Components | Weight % |
|---|---|
| Vestoplast 408 from Evonik | 98 |
| Finawax S from Fine Organics | 2 |
| Total | 100 |

The polymer melt after melting and mixing is cast as ribs on the same Nordson applicator followed and compared it with ribs cast with HB fullers 9250. The results are compared below:

TABLE 4

| | | Experiment number | |
|---|---|---|---|
| Machine Parameter | Unit | A | B |
| Adhesive grade | | Advantra PHP 9250 | Vestoplast 408 |
| Tank Temperature | Deg. C. | 130 | 190 |
| Tank Pressure | Kg/cm2 | 2 | 2 |
| Conveyor Speed | MPM | 8 | 6 |
| Angle between web and gun | Deg | 45 | 45 |
| Distance between web and gun | mm | 10 | 10 |
| Nozzle opening | tow | 8 | 12 |
| Overall thickness | mm | 2.53 | 2.60 |
| Base web thickness in mm | mm | 0.59 | 0.58 |
| Rib Thickness | mm | 1.94 | 2.02 |
| Overall GSM | g/m2 | 292 | 303 |
| Base web GSM | g/m2 | 173 | 175 |
| Rib GSM | g/m2 | 119 | 128 |
| GSM per mm rib | g/m2/mm | 61.34 | 63.3 |
| Width of the rib | mm | 2.3 | 2.34 |
| Product Properties | | | |
| Volume porosity | % | 53 | 56 |
| Electrical resistance | Ohms-cm2 | 0.116 | 0.105 |
| Surface tack at 50 Deg. C. | | Yes | No |

The results in the above table show that the adhesive made with Vestoplast 408 polymer has higher melting temperature making it more appropriate for tropical climate.

Example 4

A composite separator known by brand name Hi-Sep by the applicant company is used in this example.

A separator back web of 0.5 mm thickness is dotted using the same Nordson brand polymer applicator used in above examples to cast ribs of 2 mm wide and height 1 mm and each rib one inch apart. In the same equipment instead of ribs, beads or dots of 2 mm wide, one mm thick and 15 mm from each other in length direction and 25 mm apart in width direction is laid and the difference in weight and separator performance in terms of electrical resistance is reported in the table below. The polymer used is hot melt made by H B Fullers in the brand name Advantra 9250.

TABLE 5

| | Weight in g/meter of rib or dot line | Weight of rib or beads Grams per square meter | No of dots per line | ER 24 Hr $\Omega$-cm$^2$ |
|---|---|---|---|---|
| Weight of dot | 0.58 | 23 | 72 | 0.068 |
| Weight of rib | 2.03 | 80 | 250 | 0.105 |

From the above table, it is clearly seen the weight of rib per sq. meter of separator has reduced three times resulting in huge savings in cost and considerable reduction in electrical resistance of the separator. If the above is repeated with a foamed polymer of same chemistry, the weight further reduces resulting in further lower cost.

Advantages

The present disclosure provides a battery separator which reduces the cost of the product and also improves its performance.

The present disclosure provides a battery separator which can be incorporated on all types of separator technology.

The polymer used in the present disclosure is resistant to electrolyte, electro chemical oxidation and temperature.

The process of making the battery separator according to present disclosure is also useful in capacitors and super capacitors applications.

Further the present disclosure provides a battery separator which can be in any dimension shape and size.

Furthermore the battery separator of the present disclosure can be optionally connected with glass mat without the need for additional adhesive and a process.

I claim:

1. A battery separator comprising:
   a substrate; and
   a plurality of polymer ribs positioned on the substrate, wherein the plurality of polymer ribs are positioned in a discontinuous configuration, wherein the battery separator is a wet laid battery separator.

2. A method of forming a battery separator, comprising:
   positioning a plurality of polymer ribs on a substrate, wherein the plurality of polymer ribs are positioned in a discontinuous configuration, and wherein the battery separator is a wet laid battery separator.

3. The battery separator of claim 1, wherein the plurality of polymer ribs comprise a hot melt polymer.

4. The battery separator of claim 1, wherein the plurality of polymer ribs comprise discontinuous longitudinal ribs.

5. The battery separator of claim 1, wherein the plurality of polymer ribs comprise discontinuous diagonal ribs.

6. The battery separator of claim 1, wherein the plurality of polymer ribs comprise dispersed dots.

7. The battery separator of claim 1, wherein the plurality of polymer ribs comprise dispersed beads with varying densities.

8. The battery separator of claim 1, wherein the plurality of polymer ribs comprise vertical intermittent ribs.

9. The battery separator of claim 1, wherein the plurality of polymer ribs comprise horizontal intermittent ribs.

10. The battery separator of claim 1, wherein the plurality of polymer ribs comprise straight dash ribs and dots.

11. The battery separator of claim 1, wherein the plurality of polymer ribs comprise horizontal dash ribs and dots.

12. The battery separator of claim 1, wherein the plurality of polymer ribs comprise intermittent zig zag ribs.

13. The battery separator of claim 1, wherein the plurality of polymer ribs comprise a combination of a few or all of longitudinal ribs, diagonal ribs, dispersed dots, discrete dots, and dispersed beads.

14. The battery separator of claim 1, wherein the plurality of polymer ribs are in sinusoidal form.

15. The battery separator of claim 1, wherein the plurality of polymer ribs comprise a polymer selected from polyester, polyethylene, polypropylene, and ethylene vinyl acetate.

16. The battery separator of claim 1, wherein the plurality of polymer ribs are adhered directly onto the substrate without an intervening adhesive layer.

17. The battery separator of claim 1, wherein the substrate includes a first side and a second side, and wherein the plurality of polymer ribs are positioned on both the first and second sides of the substrate.

18. The battery separator of claim 1, wherein the substrate includes a first side and a second side, and wherein the plurality of polymer ribs are positioned on one of the first and second sides of the substrate.

19. The battery separator of claim 1, wherein the substrate is a glass mat.

* * * * *